US012785989B1

(12) United States Patent
Jampani et al.

(10) Patent No.: US 12,785,989 B1
(45) Date of Patent: Nov. 3, 2026

(54) REMOTE CRYPTOPROCESSOR-BASED AUTHENTICATION

(71) Applicant: Xage Security, Inc., Palo Alto, CA (US)

(72) Inventors: Ganesh Jampani, Gilroy, CA (US); Ray Qiu, Austin, TX (US); Akshyan Anandakrishnan, Sunnyvale, CA (US); Benjamin Paul, Palo Alto, CA (US); Harry Ku, Santa Clara, CA (US); Kunaal Sundara, Sunnyvale, CA (US)

(73) Assignee: Xage Security, Inc., Palo Alto, CA (US)

( * ) Notice: Subject to any disclaimer, the term of this patent is extended or adjusted under 35 U.S.C. 154(b) by 107 days.

(21) Appl. No.: 19/007,411

(22) Filed: Dec. 31, 2024

(51) Int. Cl.
*H04L 29/06* (2006.01)
*H04L 9/32* (2006.01)
*H04L 9/40* (2022.01)

(52) U.S. Cl.
CPC .......... *H04L 9/3268* (2013.01); *H04L 9/3271* (2013.01); *H04L 63/0209* (2013.01)

(58) Field of Classification Search
None
See application file for complete search history.

(56) References Cited

U.S. PATENT DOCUMENTS

| | | | | |
|---|---|---|---|---|
| 9,124,569 | B2 * | 9/2015 | Hussain | G06F 21/335 |
| 9,489,471 | B2 * | 11/2016 | Venkatesh | G06F 16/957 |
| 9,491,161 | B2 * | 11/2016 | Suresh | H04L 63/0272 |
| 11,050,743 | B2 * | 6/2021 | Liu | G06F 11/30 |
| 11,296,892 | B2 * | 4/2022 | Kludy | H04L 9/3247 |
| 11,483,295 | B2 * | 10/2022 | Suresh | H04L 63/0281 |
| 11,611,545 | B2 * | 3/2023 | Suresh | G06F 21/41 |
| 2015/0281225 | A1 * | 10/2015 | Schoen | H04L 63/08 726/9 |
| 2016/0094539 | A1 | 3/2016 | Suresh et al. | |
| 2018/0324172 | A1 | 11/2018 | Unnikrishnan et al. | |
| 2020/0322327 | A1 | 10/2020 | Suresh | |
| 2021/0126795 | A1 | 4/2021 | Blackie et al. | |

* cited by examiner

*Primary Examiner* — Maung T Lwin
(74) *Attorney, Agent, or Firm* — Baker Botts L.L.P.

(57) ABSTRACT

In one embodiment, a computer-implemented method includes using one or more first computing devices that are logically located within a network of a computing environment, the method comprising receiving, by the first computing device, from a second computing device, a Remote Desktop Protocol (RDP) redirection message comprising an authentication challenge, translating, by the first computing device, a protocol of the authentication challenge to Hypertext Transfer Protocol Secure (HTTPS), transmitting, by the first computing device, the authentication request to a third computing device using HTTPS, receiving, by the first computing device, a certificate from the third computing device using HTTPS and registering, by the first computing device, the certificate at the second computing device.

33 Claims, 5 Drawing Sheets

FIG. 4
400
402 Bridge executable receives certificate from cryptoprocessor
404 Bridge executable transmits certificate to browser extension
406 Browser transmits certificate to break-and-inspect instructions
408 Break-and-inspect instructions inspect certificate and transmit the certificate to the remote access node
410 Remote access node registers certificate with in virtual cryptoprocessor in target computer
412 Virtual cryptoprocessor transmits certificate to target computer browser or application
414 Target computer transmits credentials to server
416 Target computer transmits PIN or other additional factor
418 Server computer validates credentials

REMOTE CRYPTOPROCESSOR-BASED AUTHENTICATION

TECHNICAL FIELD

One technical field of the present disclosure is network security in the field of remote-access networks. Another technical field is computer-implemented remote cryptoprocessor or hardware-based authentication using multiple network communication protocols.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Software and networked computer systems are particularly susceptible to data exfiltration, identity theft, and fraud, whereby a malicious entity gains access to protected data and assets. Cybersecurity infrastructure is critical for identifying, tracing, and analyzing each critical component or service that is incorporated into various systems. These problems can be acute in certain high-risk systems, such as transportation systems, supply chain operations, energy systems, military and government defense systems, water supply operations, and utilities.

Secure servers for network or web services frequently require multi-factor authentication for client computer access. For example, the secure services may require a Personal Identification Number (PIN), authentication code, password, biometric verification, proof of possession of a physical hardware token, or a combination of factors. Some enterprises or instructions mandate using dedicated electronic hardware, separate from a computing device, to generate an authentication factor; for example, hardware tokens or token devices can be used. Hardware tokens may include cryptoprocessors that store user credentials and/or a private and public key pair. Some such hardware devices can be physically connected to a client computer using a hardware port such as a USB-A or USB-C port. A client computer may authenticate towards a service and verify possession of a cryptoprocessor by using the cryptoprocessor to send a public-key certificate and encrypted authentication communications to the secure server in response to a server challenge message that the cryptoprocessor receives via the hardware connection.

Client computers often access secure servers through a remote desktop or virtual machine. In this case, the remote desktop or virtual machine will not have physical access to the hardware token or cryptoprocessor of the client computer. In one approach, to authenticate the client computer, the remote desktop may use a Remote Desktop Protocol (RDP) redirect to route encrypted authentication communications to the client computer. However, RDP redirects are not compatible with all secure networks. RDP traffic uses specific ports that are not compatible with all network security systems.

Networks may be secured with Transport Layer Security Inspection (TLSI) or Transport Layer Security (TLS) break-and-inspect, which allows a proxy device to examine traffic as it enters a network environment to detect malicious content. However, only Hypertext Transfer Protocol Secure (HTTPS) traffic may pass through break and inspect security, and RDP traffic is incompatible with break-and-inspect.

Thus, all the foregoing approaches have significant drawbacks. Therefore, a new approach is necessary to allow for remote hardware or cryptoprocessor-based authentication through break-and-inspect security using HTTPS traffic.

SUMMARY

The appended claims may serve as a summary of the invention.

DETAILED DESCRIPTION

Figure 1:
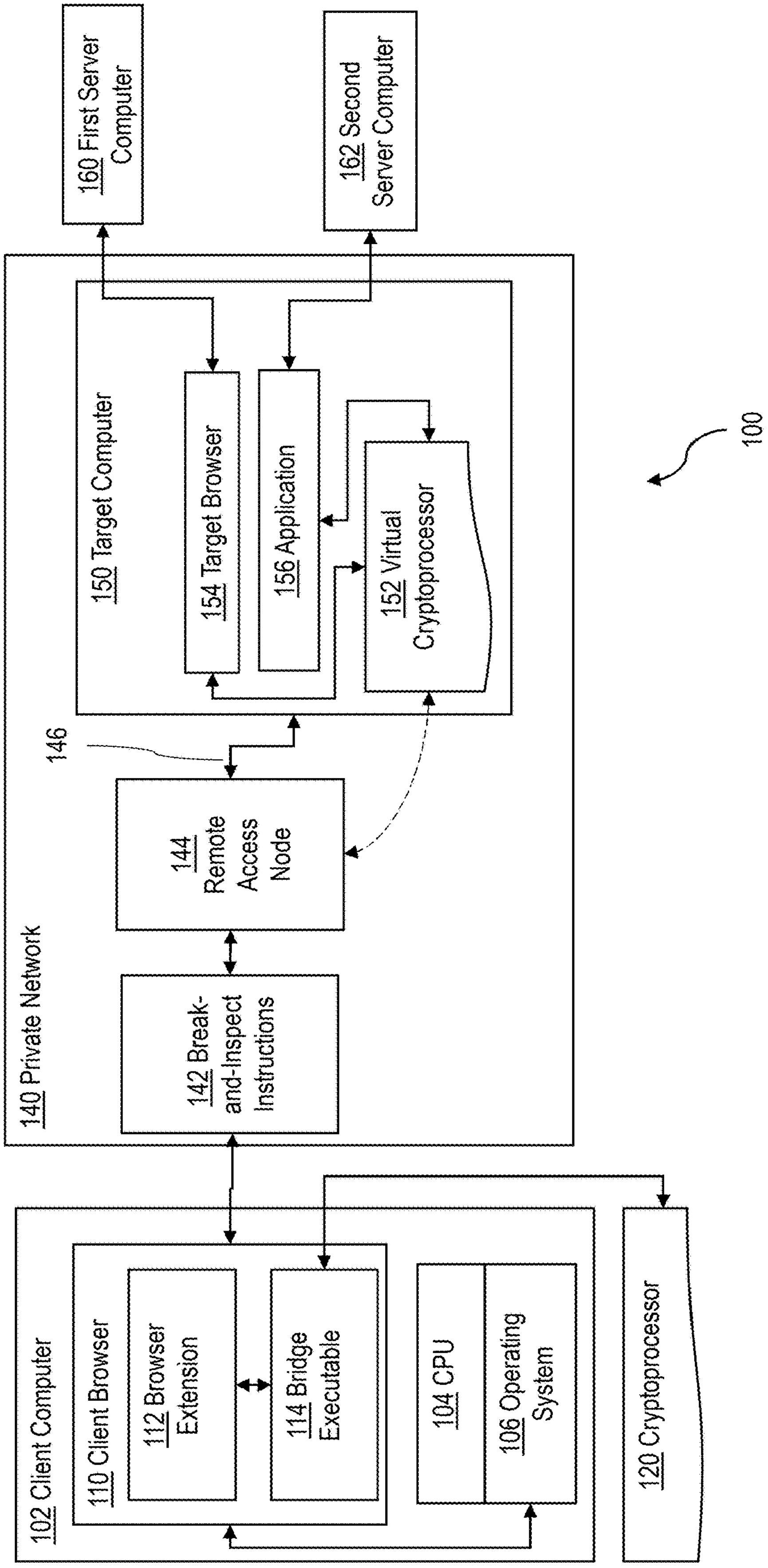
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

This disclosure may describe one or more different inventions, with alternative embodiments to illustrate examples. Other embodiments may be utilized, and structural, logical, software, electrical, and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more of the inventions nor a listing of features of one or more of the inventions that must be present in all embodiments.

Headings of sections and the title are provided for convenience but are not intended to limit the disclosure in any way or as a basis for interpreting the claims. Devices that are described as in communication with each other need not be in continuous communication with each other unless expressly specified otherwise. In addition, devices that communicate with each other may communicate directly or indirectly through one or more intermediaries, logical or physical.

A description of an embodiment with several components in communication with one other does not imply that all such components are required. Optional components may be described to illustrate various possible embodiments and to illustrate one or more aspects of the inventions more fully. Similarly, although process steps, method steps, algorithms, or the like may be described in sequential order, such processes, methods, and algorithms may generally be configured to work in different orders unless specifically stated to the contrary. Any sequence or order of steps described in this disclosure is not a required sequence or order. The steps of the described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment but need not occur only once. Some steps may be omitted In an embodiment or some occurrences, or some steps may be executed more than once in a given embodiment or occurrence. When a single device or article is described, more than one device or article may be used in place of a single device or article. Where more than one device or article is described, a single device or article may be used instead of more than one device or article.

The functionality or features of a device may be alternatively embodied by one or more other devices that are not explicitly described as having such functionality or features. Thus, other embodiments of one or more of the inventions need not include the device itself. Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code that include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

1. GENERAL OVERVIEW

Authentication requirements for secure networks or servers frequently include proof of possession of a hardware token or cryptoprocessor, such as a smart card. In an inventive moment, the inventors have discovered that improved security can be achieved by supplementing a cybersecurity architecture to provide a remote access node for storing a virtual cryptoprocessor in a target computer. The remote access node may translate an RDP authentication challenge into an HTTPS request that may pass through a break-and-inspect firewall to a client computer.

Embodiments encompass the subject matter of the following numbered clauses:

1. A computer-implemented method executed using one or more first computing devices logically located within a network of a computing environment, the method comprising receiving, by the first computing device, from a second computing device, a Remote Desktop Protocol (RDP) redirection message comprising an authentication challenge, translating, by the first computing device, a protocol of the authentication challenge to Hypertext Transfer Protocol Secure (HTTPS), transmitting, by the first computing device, the authentication request to a third computing device using HTTPS, receiving, by the first computing device, a certificate from the third computing device using HTTPS, registering, by the first computing device, the certificate at the second computing device.

2. The method of clause 1, wherein the first computing device provides remote access to the second computing device for the third computing device.

3. The method of clause 2, wherein the network of the computing environment comprises a break-and-inspect firewall and wherein the authentication challenge is transmitted to the third computing device through the break-and-inspect firewall.

4. The method of clause 2, wherein the network of the computing environment comprises a break-and-inspect firewall and wherein the certificate is transmitted to the first computing device through the break-and-inspect firewall.

5. The method of clause 1, wherein the third computing device receives the authentication challenge using a web browser extension.

6. The method of clause 5, wherein the web browser extension is programmed to invoke a bridge executable that is programmed to call an Application Programming Interface (API) of a crypto processor to request the certificate.

7. The method of clause 6, wherein the cryptoprocessor comprises a smart card comprising instructions to provide the certificate according to Public-Key Cryptography Standard #11 (PKSC #11).

8. The method of clause 1, wherein the first computing device transmits the certificate to the second computing device using an additional RDP redirect message.

9. The method of clause 8, wherein the second computing device comprises a virtual cryptoprocessor, and the first computing device registers the certificate in memory of the second computing device associated with the virtual cryptoprocessor.

10. The method of clause 9, wherein the second computing device transmits the certificate to a server using mutual transport layer security (mTLS).

11. The method of clause 10, wherein the computing environment further comprises a fourth computing device logically located within an additional network, wherein the fourth computing device receives the certificate from the third computing device and relays the certificate to the first computing device over a network tunnel.

2. STRUCTURAL AND FUNCTIONAL OVERVIEW

FIG. 1 illustrates a distributed computer system showing the context of use and principal functional elements with which one embodiment could be implemented. In an embodiment, a computer system 100 comprises components that are implemented in one or more network layers at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of providing remote hardware or cryptoprocessor-based authentication through break-and-inspect security using HTTPS traffic. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

FIG. 1 shows a computer system 100 comprising a client computer 102 in communication with a private network 140. Private network 140 may host break-and-inspect instructions 142, remote access node 144, and target computer 150. In various embodiments, the components and arrangement of the computer system 100 can vary; while FIG. 1 shows one configuration of components, and other configurations may be used without departing from the scope of the disclosure. For example, multiple components in FIG. 1 may be combined to create a single component.

As another example, the functionality performed by a single component may be performed by two or more components or multiple instances of certain components can be provided. For example, when the remote access node 144 is implemented using a Xage Fabric node from Xage Security, Inc., Palo Alto, California, many Xage Fabric nodes, each acting as a remote access node, can be deployed in various layers or zones, alone or with Xage Enforcement Points (XEPs). Xage products are mentioned as one commercial example of products that could be used in an implementation, but other implementations could use other nodes, processors, software, or components.

Client computer 102 comprises, in one embodiment, a central processing unit (CPU) 104. CPU 104 hosts operating system 106, including a kernel, primitive services, a networking stack, and similar foundation elements implemented in software, firmware, or a combination. Operating system 106 supervises and manages one or more other programs. For purposes of illustrating a clear example, FIG. 1 shows the operating system 106 coupled to a client browser 110, but other embodiments may have more or fewer programs, apps, or applications hosted on a client computer 102.

At runtime, client browser 110 loads or is installed with a browser extension 112, which comprises executable instructions for transmitting communications and messages that are compatible with break-and-inspect instructions 142 and bridge executable 114. The client browser 110 and the browser extension 112 may implement application-specific communication protocols to programmatically communicate authentication commands and data between the browser extension 112 and a remote access node 144. The client browser 110 may communicate the authentication commands and data to the remote access node 144 by first sending the authentication commands and data to the break-and-inspect instructions 142 over HTTPS. In response, the break-and-inspect instructions 142 may programmatically read and filter the authentication commands and data before forwarding it to remote access node 144. In an embodiment, the break-and-inspect instructions 142 may prevent Distributed Denial of Service (DDOoS) attacks directed towards private network 140.

In an embodiment, the browser extension 112 may comprise instructions for running or invoking a bridge executable 114 that may be a child process of the client browser 110. In an embodiment, the browser extension 112 may comprise instructions for programmatically communicating with bridge executable 114 using a native messaging protocol provided by client browser 110. Bridge executable 114 may comprise instructions for programmatically communicating with cryptoprocessor 120.

In an embodiment, a cryptoprocessor 120 is communicatively coupled to client computer 102. The cryptoprocessor 120 broadly represents any hardware security token or smart card, including Common Access Cards (CAC), YubiKey devices, including YubiKey Personal Identity Verification (PIV) devices, proximity cards, including HID cards, or other hardware authentication devices. The cryptoprocessor 120 may comprise an integrated circuit chip (ICC), which may store one or multiple pairs of corresponding private and public keys in computer memory. In an embodiment, the public keys may comprise certificates formatted according to the X.509 standard. Cryptoprocessor 120 may be communicatively coupled to the computer 102 with a physical connection. In an embodiment, the computer 102 may comprise a smart card reader configured to read the public and private keys stored by the cryptoprocessor 120 using a protocol such as Personal Computer/Smart Card (PC/SC), OpenCard, or Card Terminal-Application Programming Interface (CT-API). In another embodiment, client computer 102 may comprise a Universal Serial Bus (USB) port and cryptoprocessor 120 may comprise a USB connector.

The private network 140 broadly represents any wireline or wireless network using any form of electronic digital communication link, including satellite or terrestrial network links, such as cloud, local area networks (LANs), metropolitan area networks (MANs), wide area networks (WANs), campus network, internetworks, or combinations thereof. In an embodiment, the private network 140 may comprise an Operational Technology (OT) network, an Information Technology (IT) network, or a Demilitarized Zone (DMZ) created between OT and IT networks. The private network 140 may include or comprise the public internet and networked server computers that implement Web2 and/or Web3 technologies. The private network 140 may comprise or support intranets, extranets, or virtual private networks (VPNs).

In an embodiment, the private network 140 may comprise a network firewall or break-and-inspect instructions 142 configured to terminate all network traffic arriving from outside the private network 140 and to require packet-level inspection or protocol-level inspection. Break-and-inspect instructions 142 may be configured to provide Transport Layer Security Inspection (TLSI) and may programmatically decrypt incoming network traffic from outside private network 140, inspect the decrypted traffic, and re-encrypt the traffic before forwarding it to a receiver within the private network 140. In an embodiment, break-and-inspect instructions 142 may only permit HTTPS traffic to enter the private network 140.

The private network 140 may host target computer 150. The target computer 150 may comprise a virtual compute instance. The private network 140 may also host a remote access node 144. While node 144 can be any computing device, in one embodiment, the node is configured as a Xage Node. The remote access node 144 may provide remote access to the target computer 150 for the client computer 102. In an embodiment, the client computer 102 may transmit commands and instructions to target computer 150 from client browser 110.

In an embodiment, the remote access node 144 may register a virtual cryptoprocessor 152 in memory of target computer 150. The virtual cryptoprocessor 152 may comprise the same public keys and private keys of cryptoprocessor 120. In an embodiment, the remote access node 144 may programmatically communicate with target computer 150 using Remote Desktop Protocol (RDP). Unlike prior approaches, the communication link between the remote access node 144 and target computer 150, indicated as arrow 146, is the sole path using RDP traffic among all paths shown in FIG. 1; in an embodiment, only the remote access node 144 and target computer 150 communicate via RDP and all other paths use HTTPS. In an embodiment, the communication link between the remote access node 144 and target computer 150 may use RDP traffic to communicate authentication challenges and certificates and may use HTTPS traffic to communicate other commands or messages. In another embodiment, all traffic over the communication link between the remote access node 144 and target computer 150 may use RDP traffic. The remote access node 144 may translate HTTPS traffic from the client browser 110 to RDP traffic for target computer 150.

In an embodiment, target computer 150 may be configured to programmatically host or launch a target browser 154 and/or an application 156. Application 156 may comprise a native application. The target browser 154 and the application 156 may programmatically communicate with the first server computer 160 and the second server computer 162. In other embodiments, both the target browser 154 and the application 156 may programmatically communicate with the same server. In other embodiments the target browser 154 or the application 156 may programmatically communicate with both the first server computer 160 and the second server computer 162.

First server computer 160 and second server computer 162 may present an authentication challenge to target computer 150, which may forward the authentication challenge to client computer 102, which may respond to the challenge with certificates from cryptoprocessor 120 as described in connection with FIG. 3 and FIG. 4 below.

Figure 2:
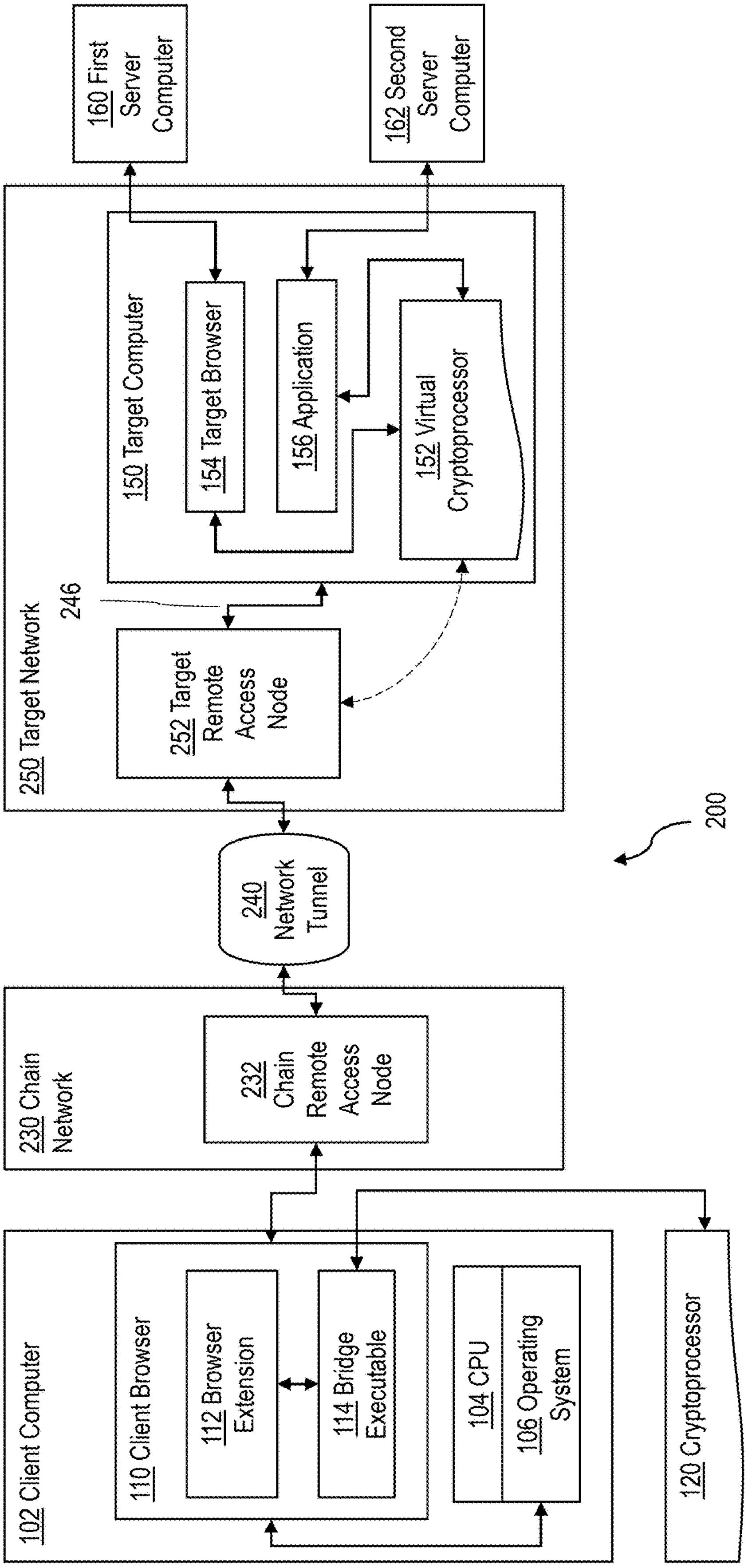
FIG. 2 illustrates a distributed computer system showing the context of use and principal functional elements with which another embodiment could be implemented.

In other embodiments, the computer system may comprise multiple network zones connected through a chain or mesh of remote access nodes. FIG. 2 illustrates such a distributed computer system, showing the context of use and principal functional elements with which one embodiment could be implemented. In an embodiment, a computer system 200 comprises components that are implemented in one or more network layers at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer in various embodiments. FIG. 2 illustrates only one of many possible arrangements of components configured to execute the programming described herein. Other arrangements may include fewer or different components, and the division of work between the components may vary depending on the arrangement.

FIG. 2 shows a computer system 200 comprising a client computer 102 in communication over a chain network 230 with the target computer 150 logically located in a target network 250. Although FIG. 2 shows an example embodiment in which two networks are connected, any number of networks may be chained together to connect the client computer 202 to the target computer 260.

The chain network 230 and the target network 250 may, like the private network 140, broadly represent any wireline or wireless network using any form of electronic digital communication link, including satellite or terrestrial network links, such as cloud, local area networks (LANs), metropolitan area networks (MANs), wide area networks (WANs), campus network, internetworks, or combinations thereof. In an embodiment, the chain network 230 and the target network 250 may comprise an Operational Technology (OT) network, an Information Technology (IT) network, or a Demilitarized Zone (DMZ) created between OT and IT networks. The network chain network 230 and the target network 250 may include or comprise the public internet and networked server computers that implement Web2 and/or Web3 technologies. The chain network 230 and the target network 250 may comprise or support intranets, extranets, or virtual private networks (VPNs).

In an embodiment, the chain network may comprise a chain remote access node 232. Additional networks in the chain or mesh may also each comprise corresponding remote access nodes. The target network 250 may comprise a target remote access node 252. While the chain remote access node 232, target remote access node 252, and additional corresponding remote access nodes can each be any computing device, in some embodiments, one or more of the nodes are configured as Xage Nodes. For example, when the chain remote access node 232, target remote access node 252, and additional corresponding remote access nodes are implemented using Xage Fabric nodes from Xage Security, Inc., many Xage Fabric nodes, each acting as a remote access node can be deployed in various layers or zones, alone or with Xage Enforcement Points (XEPs).

In an embodiment, the chain remote access node 232 may communicate with the target remote access node 252 over network tunnel 240. Network tunnel 240 may represent a secure tunnel connection using a protocol such as IPsec. Additional network tunnels, also optionally secured by using a protocol such as IPsec, may be added to connect additional chain networks and chain remote access nodes.

In an embodiment, computer system 200 comprises the client computer 102 of FIG. 1, which comprises the same components as described for FIG. 1 and is implemented in the same manner as described for FIG. 1. The client computer 102 may communicate with the target remote access node 252 using HTTPS traffic from the client browser 110 over the chain remote access node 232 and any additional chain remote access nodes logically located between client computer 102 and target network 250.

In an embodiment, the target computer 150 may be logically located within target network 250. Target computer 150 comprises the same components as described for FIG. 1 and is implemented in the same manner as described for FIG. 1. Also as implemented in FIG. 1, the communication link between the remote access node 144 and target computer 150, indicated as arrow 146, is the sole path using RDP traffic among all paths shown in FIG. 2. In an embodiment, the communication link between the remote access node 144 and target computer 150 may use RDP traffic to communicate authentication challenges and certificates and may use HTTPS traffic to communicate other commands or messages. In another embodiment, all traffic over the communication link between the remote access node 144 and target computer 150 may use RDP traffic. In an embodiment, only the remote access node 144 and target computer 150 communicate via RDP and all other paths use HTTPS to respond to an authentication challenge with certificates from cryptoprocessor 120 as described in connection with FIG. 3 and FIG. 4 below.

3. PROCEDURAL OVERVIEW

Figure 3:
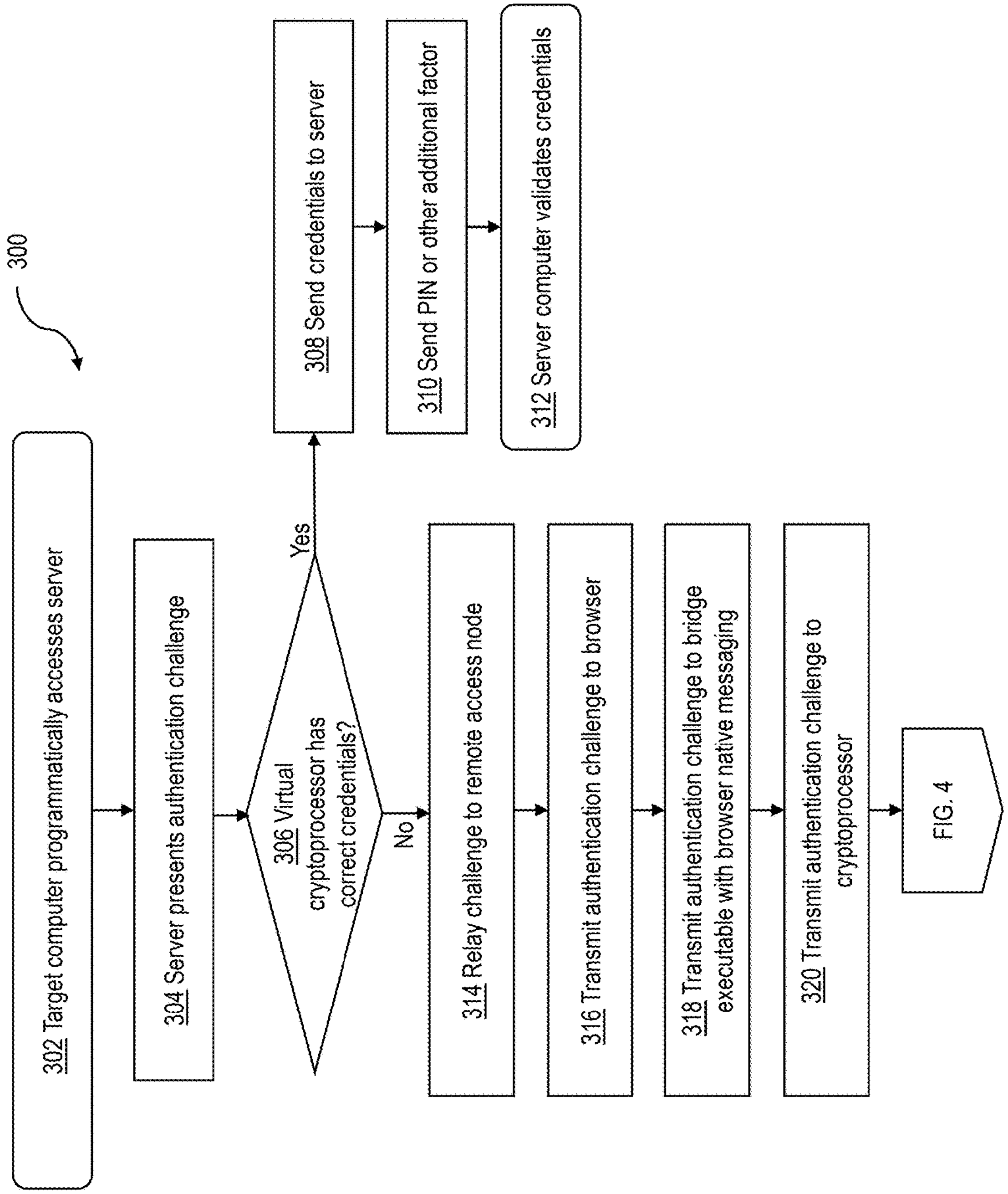
FIG. 3 illustrates a computer-implemented or programmed process for relaying a server authentication challenge to a client computer.

FIG. 3 illustrates a method of performing user authentication when a user attempts to access a sensitive data resource in a first network layer in accordance with one or more embodiments. Each of FIG. 3 and FIG. 4 illustrates examples of a computer-implemented method, algorithm, or process that can be programmed. FIG. 3 and each other flow diagram herein is intended as an illustration of the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program but are provided at the same functional level of illustration that is normally used at the high level of skill in this art to communicate the basis of developing working programs.

The operations of a flow 300, as shown in FIG. 3, can be implemented using processor-executable instructions that are stored in computer memory. For purposes of providing a clear example, the operations of FIG. 3 are described as executed by computer system 100 under the control of stored program instructions corresponding to the blocks of the flow 300, but other embodiments may use other systems, devices, or implemented techniques, such as computer system 200. One or more operations in FIG. 3 may be performed by one or more components as described in FIG. 1; for example, client computer 102, remote access node 144, and target computer 150 can be programmed, using one or more sequences of instructions, to execute an implementation of FIG. 3. While the various operations in FIG. 3 are presented and described sequentially, some or all the operations may be executed in different orders, may be combined or omitted, and some or all the operations may be executed in parallel. Furthermore, the operations may be performed actively or passively.

In an embodiment, flow 300 begins at step 302, where the process may be programmed to programmatically instruct target browser 154 or application 156 of the target computer 150 to access the first server computer 160 or second server computer 162 using a mutual transport layer security (mTLS) handshake. In response, first server computer 160 or second server computer 162 is programmed to send an authentication challenge to target computer 150 at step 304 of flow 300. The challenge may be sent over the mTLS connection formed between the target computer 150 and the first server computer 160 or second server computer 162 at step 302.

At step 306, flow 300 is programmed to test if the target computer 150 has correct, corresponding credentials to respond to the authentication challenge. The target computer 150 is programmed to test for a public key-private key pair from the virtual cryptoprocessor 152 using a PC/SC communication. If the target computer 150 has correct, corresponding credentials, the target computer is programmed to present the credentials to the challenging server over the mTLS connection at step 308.

At step 310 of flow 300, the challenging server 160 or 162 is programmed to request one or more additional factors for authentication, such as a Personal Identification Number (PIN), password, biometric verification, or another factor. At step 312 of flow 300, the challenging server 160 or 162 is programmed to validate the credentials and the one or more additional factors. If the credentials and additional factors are correct, the challenging server 160 or 162 is programmed to grant session access.

If the target computer 150 and virtual cryptoprocessor 152 do not have the correct credentials, then the flow 300 is programmed to transfer control to step 314, at which point the target computer 150 is programmed to relay the authentication challenge to the remote access node 144. The target computer can be programmed to relay the authentication challenge using an RDP redirect message, with the remote access node 144 acting as a client and the target computer acting as a remote server under the RDP standard.

In an embodiment, the remote access node may comprise instructions to convert a protocol of the received authentication challenge from RDP to HTTPS. At step 316 of flow 300, the remote access node 144 is programmed to transmit the authentication challenge to the client browser 110 over HTTPS. In an embodiment, the remote access node 144 is programmed to transmit the authentication challenge through a Websockets connection between the client browser 110 and the remote access node 144.

At step 318 of flow 300, the client browser 110 may programmatically instruct the browser extension 112 to call the bridge executable 114 using a native messaging infrastructure of the client browser 110 to transmit the authentication challenge. In an embodiment, the bridge executable 114 is programmed to respond to the call by transmitting the authentication challenge to cryptoprocessor 120 at step 320 of flow 300. The bridge executable 114 may call the cryptoprocessor 120 with a request for a certificate using the PC/SC protocol. The flow 300 may continue executing at step 402 of flow 400 in FIG. 4.

Figure 4:
FIG. 4 illustrates a computer-implemented or programmed process for relaying a certificate from a client computer to a server.

Referring to FIG. 4, in an embodiment, executing flow 400 may begin at step 402. The operations of a flow 400, as shown in FIG. 4, can be implemented using processor-executable instructions that are stored in computer memory. For purposes of providing a clear example, the operations of FIG. 4 are described as performed by computer system 100, but other embodiments may use other systems, devices, or implemented techniques, such as computer system 200. One or more operations in FIG. 4 may be performed by one or more components as described in FIG. 1; for example, client computer 102, remote access node 144, and target computer 150 can be programmed, using one or more sequences of instructions, to execute an implementation of FIG. 4. While the various operations in FIG. 4 are presented and described sequentially, one of ordinary skill in the art will appreciate that some or all the operations may be executed in different orders, may be combined or omitted, and some or all the operations may be executed in parallel. Furthermore, the operations may be performed actively or passively.

At step 402 of flow 400, the bridge executable 114 is programmed to receive a certificate from the cryptoprocessor 120, transmitting using PC/SC protocol. The certificate may have been provided in response to the bridge executable 114 calling the cryptoprocessor 120 at step 320 of FIG. 3.

At step 404 of flow 400, the bridge executable 114 is programmed to transmit the certificate to the browser extension 112 over browser native messaging provided by client browser 110. At step 406 of flow 400, the client browser 110 is programmed to transmit the certificate to the break-and-inspect instructions 142. In an embodiment, the client browser 110 may transmit the certificate using HTTPS over a Websockets connection.

In response to receiving the certificate, the break-and-inspect instructions 142 are programmed to inspect the certificate and transmit the certificate to the remote access node 144 at step 408 of flow 400. In an embodiment, the break-and-inspect instructions 142 may be part of a firewall or a TLSI system. In an embodiment, the break-and-inspect instructions 142 are programmed to inspect all traffic entering the target network 250 and may only allow HTTPS traffic determined to be non-malicious to enter the target network 250.

At step 410 of flow 400, the remote access node 144 is programmed to register the certificate in the virtual cryptoprocessor 152. In an embodiment, the certificate may only be stored in memory of the target computer 150 for the duration of a remote access session between client computer 102 and target computer 150. In another embodiment, the certificate may be stored in long-term or permanent storage of target computer 150.

At step 412 of flow 400, the virtual cryptoprocessor 152 is programmed to transmit the certificate to target browser 154 or application 156. The virtual cryptoprocessor 152 may provide the certificate to the target browser 154 or application 156 using a PC/SC communication. In an embodiment, the target computer 260 may receive an input selecting one certificate among several certificates to be provided to the target browser 154 or application 156. In an embodiment, virtual cryptoprocessor 266 may store two or three certificates or public key-private key pairs that may be selected. Flow 400 may then proceed to step 414, at which point the target computer 260 is programmed to transmit the certificate an mTLS connection between the target computer 150 and the first server computer 160 or second server computer 162.

At step 416 of flow 400, the challenging server 160 or 162 is programmed to request one or more additional factors for authentication, such as a Personal Identification Number (PIN), password, biometric verification, or another factor. At step 418 of flow 400, the challenging server 160 or 162 is programmed to validate the credentials and the one or more additional factors. If the credentials and additional factors are correct, the challenging server 160 or 162 may grant session access.

4. IMPLEMENTATION EXAMPLE-HARDWARE OVERVIEW

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
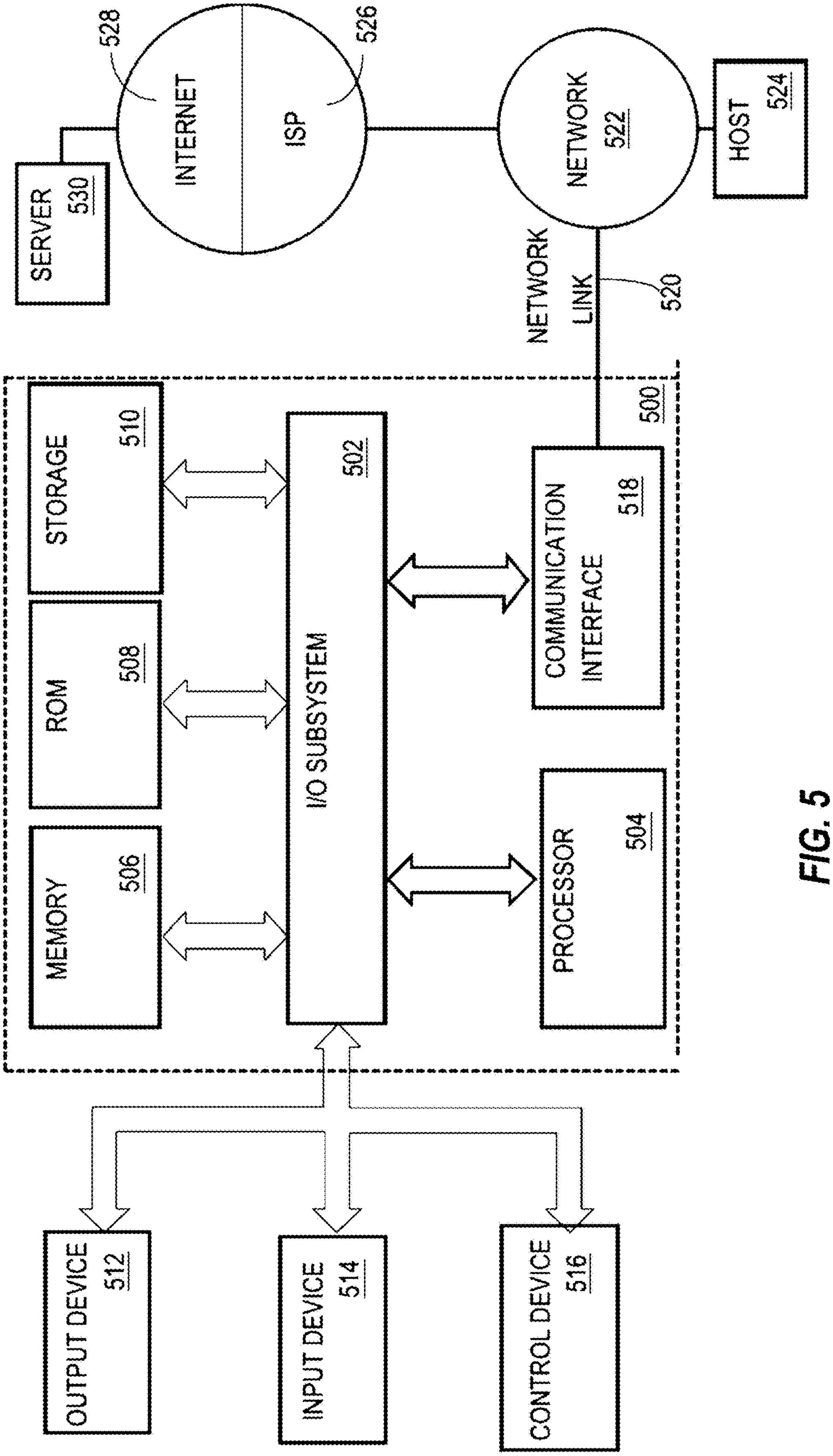
FIG. 5 illustrates a computer system with which one embodiment could be implemented.

FIG. 5 illustrates a computer system with which one embodiment could be implemented; other embodiments can omit one or more elements, such as some or all of the specified input devices or output devices that facilitate human use. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller, and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU), or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or another dynamic storage device. Memory 506 also may be used for storing temporary variables or other intermediate information during the execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read-only memory (ROM) 508 or other static storage devices coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, solid-state storage, magnetic disk, or optical disks such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer such as a relational database system using a structured query language (SQL) or no SQL, an object store, a graph database, a flat file system, or other data storage.

Computer system 500 may be coupled via I/O subsystem 502 to at least one output device 512. In one embodiment, output device 512 is a digital computer display. Examples of a display that may be used in various embodiments include a touchscreen display or a light-emitting diode (LED) display or a liquid crystal display (LCD) or an e-paper display. Computer system 500 may include other types of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections, or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. The control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or another type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders, and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware, and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire, and fiber optics, including the wires that comprise a bus of I/O subsystem 502. Transmission media can also take the form of acoustic or light waves, such as those generated during radio-wave and infrared data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to the bus of I/O subsystem 502. Communication interface 518 provides a two-way data communication coupling to network link(s) 520 that are directly or indirectly connected to at least one communication network, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 522 broadly represents a local area network (LAN), wide-area network (WAN), campus network, internetwork, or any combination thereof. Communication interface 518 may comprise a LAN card to provide a data communication connection to a compatible LAN, a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic, or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a worldwide packet data communication network represented as internet 528. A server computer 530 may be coupled to internet 528. Server 530 broadly represents any computer, data center, virtual machine, or virtual computing instance with or without a hypervisor or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, a server farm, or other organizations of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer, and data storage layer such as a relational database system using a structured query language (SQL) or no SQL, an object store, a graph database, a flat file system or other data storage.

Computer system 500 can send messages and receive data and instructions, including program code, through the network(s), network link 520, and communication interface 518. In the Internet example, server 530 might transmit a requested code for an application program through Internet 528, ISP 526, local network 522, and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

5. BENEFITS AND IMPROVEMENTS

Embodiments provide the distinct benefits over prior practice of using the RDP protocol only in certain limited communications. For example, as described for FIG. 1, unlike prior approaches, the communication link between the remote access node 144 and target computer 150, indicated as arrow 146, is the sole path using RDP traffic among all paths shown in FIG. 1; in an embodiment, only the remote access node 144 and target computer 150 communicate via RDP and all other paths use HTTP. This approach offers the distinct benefit that certificates and authentication challenges, which, under prior practice, are communicated using only RDP protocol, can now be communicated through robust network security and firewalls that only permit HTTPS traffic to enter secured networks. By creating a method by which these certificates and challenges may be communicated through network security, the inventors have developed a process for client computers located outside a secured network to provide hardware token credentials from a cryptoprocessor to a virtual machine or remote computer within the secured network.

Embodiments also provide a system or method in which a chain of networks can relay authentication challenges and certificates from a client computer to a target virtual machine or target remote computer located logically within a target network. The chain of networks can contain multiple network security systems or firewalls as described above or may provide network administrators flexibility to design networks for client computers to provide hardware token credentials from a cryptoprocessor to a virtual machine or remote computer within the target network.

6. SCOPE AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method executed using one or more first computing devices logically located within a network of a computing environment, the method comprising:

receiving, by the first computing device, from a second computing device, a Remote Desktop Protocol (RDP) redirection message comprising an authentication challenge;

translating, by the first computing device, a protocol of the authentication challenge to Hypertext Transfer Protocol Secure (HTTPS);

transmitting, by the first computing device, the authentication challenge to a third computing device using HTTPS;

receiving, by the first computing device, a certificate from the third computing device using HTTPS; and registering, by the first computing device, the certificate at the second computing device.

2. The computer-implemented method of claim 1, wherein the first computing device provides remote access to the second computing device for the third computing device.

3. The computer-implemented method of claim 2, wherein the network of the computing environment comprises a break-and-inspect firewall and wherein the authentication challenge is transmitted to the third computing device through the break-and-inspect firewall.

4. The computer-implemented method of claim 2, wherein the network of the computing environment comprises a break-and-inspect firewall and wherein the certificate is transmitted to the first computing device through the break-and-inspect firewall.

5. The computer-implemented method of claim 1, wherein the third computing device receives the authentication challenge using a web browser extension.

6. The computer-implemented method of claim 5, wherein the web browser extension is programmed to launch a bridge executable that is programmed to call an Application Programming Interface (API) of a cryptoprocessor to request the certificate.

7. The computer-implemented method of claim 6, wherein the cryptoprocessor comprises a smart card comprising instructions to provide the certificate according to Public-Key Cryptography Standard #11 (PKSC #11).

8. The computer-implemented method of claim 1, wherein the first computing device transmits the certificate to the second computing device using an additional RDP redirect message.

9. The computer-implemented method of claim 8, wherein the second computing device comprises a virtual cryptoprocessor and the first computing device registers the certificate in memory of the second computing device associated with the virtual cryptoprocessor.

10. The computer-implemented method of claim 9, wherein the second computing device transmits the certificate to a server using mutual transport layer security (mTLS).

11. The computer-implemented method of claim 10, wherein the computing environment further comprises a fourth computing device logically located within an additional network, wherein the fourth computing device receives the certificate from the third computing device and relays the certificate to the first computing device over a network tunnel.

12. A computer system, comprising:

one or more processors;

one or more computer-readable non-transitory storage media coupled to the one or more processors and comprising instructions operable when executed by the one or more processors to cause the system to execute, by one or more first computing devices logically located within a network of a computing environment:

receiving, by the first computing device, from a second computing device, a Remote Desktop Protocol (RDP) redirection message comprising an authentication challenge;

translating, by the first computing device, a protocol of the authentication challenge to Hypertext Transfer Protocol Secure (HTTPS);

transmitting, by the first computing device, the authentication challenge to a third computing device using HTTPS;

receiving, by the first computing device, a certificate from the third computing device using HTTPS; and registering, by the first computing device, the certificate at the second computing device.

13. The computer system of claim 12, wherein the first computing device provides remote access to the second computing device for the third computing device.

14. The computer system of claim 13, wherein the network of the computing environment comprises a break-and-inspect firewall and wherein the authentication challenge is transmitted to the third computing device through the break-and-inspect firewall.

15. The computer system of claim 13, wherein the network of the computing environment comprises a break-and-inspect firewall and wherein the certificate is transmitted to the first computing device through the break-and-inspect firewall.

16. The computer system of claim 12, wherein the third computing device receives the authentication challenge using a web browser extension.

17. The computer system of claim 16, wherein the web browser extension is programmed to launch a bridge executable that is programmed to call an Application Programming Interface (API) of a cryptoprocessor to request the certificate.

18. The computer system of claim 17, wherein the cryptoprocessor comprises a smart card comprising instructions to provide the certificate according to Public-Key Cryptography Standard #11 (PKSC #11).

19. The computer system of claim 12, wherein the first computing device transmits the certificate to the second computing device using an additional RDP redirect message.

20. The computer system of claim 19, wherein the second computing device comprises a virtual cryptoprocessor and the first computing device registers the certificate in memory of the second computing device associated with the virtual cryptoprocessor.

21. The computer system of claim 20, wherein the second computing device transmits the certificate to a server using mutual transport layer security (mTLS).

22. The computer system of claim 21, wherein the computing environment further comprises a fourth computing device logically located within an additional network, wherein the fourth computing device receives the certificate from the third computing device and relays the certificate to the first computing device over a network tunnel.

23. One or more computer-readable non-transitory storage media storing one or more sequences of instructions which, when executed using one or more processors, cause the one or more processors to execute, using one or more first computing devices logically located within a network of a computing environment:

receiving, by the first computing device, from a second computing device, a Remote Desktop Protocol (RDP) redirection message comprising an authentication challenge;

translating, by the first computing device, a protocol of the authentication challenge to Hypertext Transfer Protocol Secure (HTTPS);

transmitting, by the first computing device, the authentication challenge to a third computing device using HTTPS;

receiving, by the first computing device, a certificate from the third computing device using HTTPS; and registering, by the first computing device, the certificate at the second computing device.

24. The computer-readable non-transitory storage media of claim 23, wherein the first computing device provides remote access to the second computing device for the third computing device.

25. The computer-readable non-transitory storage media of claim 24, wherein the network of the computing environment comprises a break-and-inspect firewall and wherein the authentication challenge is transmitted to the third computing device through the break-and-inspect firewall.

26. The computer-readable non-transitory storage media of claim 24, wherein the network of the computing environment comprises a break-and-inspect firewall and wherein the certificate is transmitted to the first computing device through the break-and-inspect firewall.

27. The computer-readable non-transitory storage media of claim 23, wherein the third computing device receives the authentication challenge using a web browser extension.

28. The computer-readable non-transitory storage media of claim 27, wherein the web browser extension is programmed to launch a bridge executable that is programmed to call an Application Programming Interface (API) of a cryptoprocessor to request the certificate.

29. The computer-readable non-transitory storage media of claim 28, wherein the cryptoprocessor comprises a smart card comprising instructions to provide the certificate according to Public-Key Cryptography Standard #11 (PKSC #11).

30. The computer-readable non-transitory storage media of claim 23, wherein the first computing device transmits the certificate to the second computing device using an additional RDP redirect message.

31. The computer-readable non-transitory storage media of claim 30, wherein the second computing device comprises a virtual cryptoprocessor and the first computing device registers the certificate in memory of the second computing device associated with the virtual cryptoprocessor.

32. The computer-readable non-transitory storage media of claim 31, wherein the second computing device transmits the certificate to a server using mutual transport layer security (mTLS).

33. The computer-readable non-transitory storage media of claim 32, wherein the computing environment further comprises a fourth computing device logically located within an additional network, wherein the fourth computing device receives the certificate from the third computing device and relays the certificate to the first computing device over a network tunnel.

* * * * *